United States Patent [19]

Dore et al.

[11] 4,024,212

[45] May 17, 1977

[54] CERAMIC FOAM AND METHOD OF PREPARATION

[75] Inventors: James E. Dore, Ballwin, Mo.; John C. Yarwood, Madison; Robert K. Preuss, Middletown, both of Conn.

[73] Assignee: Swiss Aluminium Ltd., Chippis, Switzerland

[22] Filed: June 23, 1975

[21] Appl. No.: 589,294

Related U.S. Application Data

[63] Continuation-in-part of Ser. No. 563,213, March 28, 1975, Pat. No. 3,962,081.

[52] U.S. Cl. .................................. 264/44; 264/43; 264/344
[51] Int. Cl.² .......................................... B29H 7/20
[58] Field of Search ................ 264/44, 42, 43, 344

[56] References Cited

UNITED STATES PATENTS

| | | | |
|---|---|---|---|
| 3,090,094 | 5/1963 | Schwartzwalder | 264/44 |
| 3,097,930 | 7/1963 | Holland | 264/44 |
| 3,111,396 | 11/1963 | Ball | 264/44 |

*Primary Examiner*—Robert F. White
*Assistant Examiner*—John Parrish
*Attorney, Agent, or Firm*—Robert H. Bachman

[57] ABSTRACT

Ceramic foams possessing controlled permeability and uniformity are prepared by the impregnation of an open-celled organic polymer foam material possessing a predetermined permeability and resilience with a aqueous slurry of a thixotropic ceramic composition while shearing said slurry an amount sufficient to maximize said impregnation, and expelling excess slurry from said material by conducting at least two passes of said material through preset rollers to effect a temporary compression ranging from about 50 to 90% for the first pass and 70 to 90% for the second pass. The resulting material is then dried and heated to remove the organic foam component. The foams prepared in accordance with the present invention are useful as filters for molten aluminum.

24 Claims, No Drawings

CERAMIC FOAM AND METHOD OF PREPARATION

CROSS REFERENCE TO RELATED APPLICATION

This application is a Continuation-In-Part of Ser. No. 563,213, filed Mar. 28, 1975 by the inventors herein, now U.S. Pat. No. 3,962,081.

BACKGROUND OF THE INVENTION

The present invention relates generally to ceramic foams and their methods of preparation and particularly to such ceramic foams as find use in the filtration of molten metals such as molten aluminum.

The preparation of porous ceramic articles such as ceramic foams from the impregnation of open-celled organic sponges or foam materials has been disclosed in the prior art, as represented by U.S. Pat. No. 3,090,094 to Schwartzwalder et al. and U.S. Pat. No. 3,097,930 to Holland. Likewise, the use of such articles as filters for molten metal and particularly for the filtration of molten aluminum and copper has been disclosed in U.S. application Ser. No. 430,229 for "Improved Molten Metal Filter" by Michael J. Pryor et al., filed Jan. 2, 1974.

Though, as noted above, the preparation of porous ceramic articles is known, the successful use of such articles in exacting functions such as the filtration of molten metal requires that the article possess particular physical and chemical properties. Specifically, the ceramic foam articles requires a certain permeability and structural uniformity to efficiently filter molten metal at commercially acceptable rates and purity levels. As a corollary property, the foam material must withstand chemical attack from the molten metal to facilitate its extended use as a filter.

As noted above, the prior art suggests the preparation of ceramic foam materials. Particularly, U.S. Pat. No. 3,111,396 to Ball suggests that an organic polymer foam impregnated with a refractory material may then be compressed by passage through preset rollers to effect the removal of excess refractory. This technique, which is comparable to a wide variety of conventional expulsion techniques used in the art suffers from an inherent disadvantage in that the slurry is not completely uniformly distributed through the body of the article. Thus, the outer area of the article tends to be more thinly coated with slurry than that near the center line. Such defects are particularly extended at the extremes of the permeability range found suitable for use in the preparation of molten metal filters; thus, bodies possessing a high permeability tend to have undesirably weak surfaces and edges whereas, bodies possessing relatively low permeability tend to exhibit undesirable center line blockage. Both of the aforenoted defects render the resulting foams unsuitable for use in the filtration of molten metal.

SUMMARY OF THE INVENTION

In accordance with the present invention, ceramic foam articles of controlled permeability and structural uniformity are prepared by a process comprising providing an open-celled organic polymer foam material possessing a predetermined permeability and resilience, impregnating said polymer foam material with an aqueous slurry of a thixotropic ceramic composition while shearing said slurry an amount sufficient to maximize impregnation, and expelling excess slurry from said foam material by conducting at least two passes of said material through preset rollers to effect a temporary compression of from about 50 to 90% for the first pass and 70 to 90% for the second pass. The resulting foam structure is then dried and heated to remove the organic foam component. The resulting article is ready for use or may be further heated to sinter the ceramic material.

The method of the present invention enables the accurate control of the permeability of the resulting ceramic foam article. Further, foams prepared in accordance with the invention exhibit structural uniformity, as neither center line blockage nor weak outer surfaces are encountered. When the articles of the present invention are employed in the filtration of molten metal, it has been found that they can successfully withstand the rigors of the extended exposure to metal flow without blockage or fracture, and the resulting metal filtrate possesses unexpectedly improved purity.

Accordingly, it is a principal object of the present invention to provide a method for the preparation of ceramic foam articles which is both accurate and expedient.

It is a further object of the present invention to provide a method as aforesaid which yields products possessing permeabilities within closely set tolerences.

It is yet a further object of the present invention to provide ceramic foam articles as aforesaid which exhibit structural uniformity and freedom from defects such as center line blockage and outer surface weakness.

It is a still further object of the present invention to provide a method as aforesaid which lends itself to rapid commercial-scale production techniques.

Other objects and advantages will be apparent from a careful review of the ensuing description.

DETAILED DESCRIPTION

In accordance with the present invention, the foregoing objects and advantages are readily obtained.

Ceramic foams possessing controlled permeability and structural uniformity are prepared by a process comprising providing an open-celled organic polymer foam material possessing a predetermined permeability and resilience, impregnating said polymer material with an aqueous slurry of a thixotropic ceramic composition while shearing said slurry an amount sufficient to maximize impregnation, and expelling excess slurry from said material by conducting at least two passes of said material through preset rollers to effect a temporary compression ranging from about 50 to 90% of the thickness of said material for the first pass, and 70 to 90% of said thickness for the second pass. After impregnation and expulsion of excess slurry are complete, the resulting foam material is then heated to remove the organic foam component. The resulting article is then ready for use, or may, if desired, be further heated to sinter the ceramic material.

As noted earlier, and as set forth in our copending application Ser. No. 563,213, the disclosure of which is incorpoated herein by reference, the preparation of the ceramic foam articles of the present invention is dependent upon the observance of certain critical properties and parameters. Thus, the provision of the open-celled organic polymer foam material must be made with a view to control of the permeability and resilience of the final ceramic article. The ceramic foams of the present invention may advantageously possess an air permeability in the range of 400 to 8,000 × $10^{-7}$ cm$^2$ in the case where they are to be used as filters for molten aluminum. The determination of air permeability is derived from the text *Micromeretics* by J. M. Dallavalle, published by Pitman, 1948, at page 263. In accordance with the present invention, the air permeability of the resulting ceramic articles has been found to depend upon the permeability of the organic polymer foam employed in its preparation. For example, ceramic foams having permeabilities in the range of from about 800 to about 2,200 × $10^{-7}$ cm$^2$ have been prepared from polyurethane foam materials having air permeabilities ranging from 4,500 to 5,400 × $10^{-7}$ cm$^2$. Further, the selection of raw foam permeability in the range of ±2% facilitates the preparation of a ceramic foam having a permeability predetermined to within a range of ±5%.

In addition to the control of permeability, the foams of the present invention must possess structural uniformity and a particular range of cell size. Structural uniformity has been found to relate to the resilience of the organic polymer foam precursor. Particularly, resilience may be determined with reference to certain standards set forth in the ASTM-D-1564-71 which refers to the properties of compression set and resilience as measured by ball rebound. Compression set, determined by the compression load deflection test, measures the extent to which the foam returns to its original size or thickness after compression to a stated reduction such as, for exaple, 50%. Foams found suitable in accordance with the invention exhibit a compression set of less than 30% at 50% compression, and thus, return to at least 70% of their original thickness after compression is released. Resilience, determined by the ball rebound test, measures the resistance that the material exhibits to compression by the height of rebound of a steel ball dropped from a stated distance onto a foam sample. The percentage of return of the ball to the original height is noted, and foams suitable in the present invention have been found to be those possessing ball rebounds of greater than 25%.

The above properties have been measured in terms of tests run under dry conditions, however, such properties must be substantially retained in an aqueous environment as, for example, during impregnation with the aqueous ceramic slurry of the present invention. Accordingly, it has been found that hydrophobic foams perform better and are preferred to hydrophilic foams, as the latter suffer considerable loss of resilience in aqueous environments. This loss of resilience is evident in the occurrence of the aforenoted defect of center line blockage.

With the above noted criteria in mind, organic polymer foam materials which may be employed in the present invention include a wide variety of highly resilient, reticulated hydrophobic materials such as the polyester and polyether polyurethanes, such as "high resilience" or "cold cure" urethane materials which utilize polymeric isocyanates in their formulation; polyvinyl foams such as polyvinyl chloride, polyvinyl acetate, and polyvinyl foams of different copolymers; polyurethanes coated with polyethylene or polysiloxane polymers and copolymers; and foams prepared from suitable natural resins such as cellulosic derivatives. The foams must burn out or volatilize at below the firing temperature of the ceramic material with which they are impregnated. As noted earlier, the dimensions of the foam should correspond roughly to the dimensions of the desired ceramic article. Thus, for example, a foam material having a thickness ranging from about ½ to 4 is employed when the resulting ceramic foam is to function as a molten metal filter.

In addition to the properties of permeability and uniformity, the above noted polymeric materials must possess a pore size within defined limits in order to render them effective in the preparation of molten metal filters. Pore or cell size has been found to be important to the structural uniformity of the ceramic foam and should vary within the ranges of 5 ppi (pores per linear inch) and 50 ppi.

The control of the above noted variables contributes to the structural uniformity and permeability of the resulting filter and directly effects metal flow rate and effectiveness through the tortuosity of the flow path. Though these factors are significant, additional factors will be discussed hereinbelow which combine to provide further control of the final ceramic foam article.

The organic foam selected with reference to the above discussion is then impregnated with a slurry of a thixotropic ceramic material. The property of thixotropy is important to the present invention as it affects the uniformity of structure and strength of the final ceramic foam article. Thixotropic materials are those which display a high resistance to flow under low rates of shear and correspondingly, a low resistance to flow under relatively high rates of shear. As this relates to the method of the present invention, the ceramic slurry must possess sufficient fluidity to rapidly enter and fill the voids of the organic foam material and thereby coat the surrounding polymer web, while possessing a sufficient viscosity to resist running out or draining from the foam once impregnation is complete. It has been found in accordance with the present invention that certain ceramic materials prepared in combination with particular air setting agents and temporary binders display the desired thixotropic character to succssfully conduct impregnation.

As the ceramic slurry which is employed herein may vary according to the end use of the foam, a wide variety of ceramic materials of varying refractoriness may be employed. Particularly, such materials as alumina, chromia, zirconia, magnesia, titania, silica and mixtures thereof may be present. Such materials are noted for their relatively high refractoriness or ability to serve in high temperature situations. However, other materials of lesser refractoriness such as mullite, calcined clay and various glasses of high softening temperature may be employed herein either alone or in combination with each other and with more refractory materials to prepare the resulting foam article. Insofar as the utility of the resulting article as a molten metal filter is concerned, the only requirement placed on a selection of the particular ceramic materials is that they provide the article with sufficient resistance to the chemical attack of the molten alloys over the exposure times involved in filtration. A particular composition which has been successfully employed herein comprises a mixture of alumina and chromia.

The above composition also includes a room temperature binder or air setting agent which provides green strength to the slurry, particularly during the bake out and the optional sintering operations where the foam is subjected to thermal stress. A wide variety of air setting or binder agents are known in the art which would be suitable in this regard. Thus, for example, the composition of the present invention may employ such materials as colloidal aluminum orthophosphate, alkali metal silicates such as sodium and potassium silicate, ethyl silicate, aluminum hydroxychloride, magnesium orthoborate, and the like. The binder of air setting agent is generally employed in a 50% aqueous solution which may be employed in the range of from 5 to about 50% of the total slurry. Preferably, the binder solution is employed in a range of from 25 to 35% of the slurry.

In addition to the binder noted above, certain agents herein referred to as rheological agents are employed which serve to promote the desired thixotropic property of the slurry. Several materials are known which may serve as rheological agents, among them certain organic materials such as carboxymethyll cellulose and hydroxyethyl cellulose, and certain inorganic materials such as bentonite and kaolin. Of the materials available in this regard, bentonite has been found to be particularly preferred. Bentonite is a naturally occurring clay composed primarily of aluminum and various silicates, usually including quantities of magnesium and iron. In addition to its promotion of the thixotropic properties of the slurry, bentonite performs a small setting or binding function, as certain glassy phases are produced upon firing of the article which yield increased strength in the final foam structure. In addition to bentonite, a small amount of kaolin may also be employed which provided both binding and rheological improvement to the final slurry in the same manner as bentonite. Kaolin is a clay composed of primarily of alumina and silica. Naturally, one could employ the chemical equivalents of the aforenoted materials to approximate their compositions. The general range of addition of the rheological agents of the present invention is within about 0.1 to about 12% by weight of the slurry. In a preferred embodiment, the rheological agents are added in an amount ranging from about 0.5-2% by weight.

Though, as indicated above, the thixotropic ceramic material may be prepared in a wide variety of formulations, a particular composition has been determined to be eminently suitable which comprises alumina in an amount ranging from about 40-80%, and preferably from about 45-50%, chromia in an amount ranging up to about 20%, and preferably from about 10-15%, kaolin in an amount ranging up to about 10%, and preferably from about 2-5%, bentonite in an amount ranging from about 0.1-10%, and preferably from about 0.5-2%, colloidal aluminum orthophosphate (50% solution) in an amount of from about 5-50%, and preferably from about 25-35%. Additional water may be added to the above formulation in amounts ranging up to about 20%, and preferably from about 5-10% for the purpose of adjusting viscosity, discussed in detail hereinbelow. Though the foregoing formulation is suggested in its preferred ranges, it is to be understood that the invention is not limited thereto, as other formulations may be prepared from the ingredients recited earlier.

In addition to its thixotropic properties, the ceramic slurry of the present invention must possess a carefully controlled viscosity at and during the time of impregnation. The character of viscosity has been found to exert a material effect on the achievement of a reproducibly uniform ceramic article. The desired range of viscosity has been found to be from $1 \times 10^3$ to $80 \times 10^3$ cps (centipoise), and preferably within the range of $10 \times 10^3$ to $40 \times 10^3$ cps. Viscosity is regulated during the formulation of the slurry and must be within the aforenoted ranges at the time the slurry is to impregnate the organic polymer foam. As noted above, a convenient way of regulating and thereby controlling viscosity is through the variation in excess water content within the ranges specified above. For the purposes of the present invention, viscosity is measured at 25° C with a No. 6 spindle, Brookfield RVT Viscometer at 20 rpm after 20 minutes rotation, the slurry having previously been mixed in an 80-quart Hobart Mixer at 60 rpm for 30 minutes.

Once the ceramic slurry is prepared to within the aforenoted limitation of viscosity, the impregnation of the organic foam material can be conducted. Thus, slabs of reticulated polyurethane foam having pore sizes lying between 5 and 50 ppi are immersed in the slurry until the interstices of the foam are fully saturated therewith. Impregnation may be conducted by one of many techniques. For example, the foam slab may be totally immersed in the slurry and passed through a pair of rolls likewise immersed therein to expell air from the pores of the foam on compression whereby the reexpanding foam emerging from the rolls draws in the slurry and is thereby filled therewith. Another technique which may be employed would involve placing the foam over a bath of the slurry in an enclosed vessel, evacuating the vessel to a reduced pressure, immersing the foam in the bath of slurry and then releasing the vacuum in the vessel. This method which would comprise a modification of vacuum impregnation would likewise result in the total saturation of the foam with slurry, Naturally, other forms of impregnation including the standard vacuum impregnation technique of merely exerting the vacuum force on one side of the foam while drawing slurry through the opposite side, would be applicable herein and the invention should not be limited to a particular technique per se.

A preferred impregnation technique which has been employed herein comprises complete immersion of the foam in a bath of slurry and repeated compression and expansion of the foam by a mechanical plunger device made from perforated steel sheet. This process is conducted for from 30 seconds to 1 minute, or, of course, until the interstices of the foam are completely saturated. In view of the thixotropic nature of the slurry discussed earlier, its is particularly advantageous and important that the slurry be continually sheared during the impregnation to maintain the desired rate to flow into the foam material. This shearing may be accomplished in a wide variety of ways such as the continual high speed agitation of the slurry. A technique which has been employed in the present invention comprises the continual vibration of the slurry during impregnation. It should be noted at this point that all impregnation techniques previously discussed would require that the slurry be maintained in its highly flowable state by some form of shearing action such as vibration or the like. Upon completion of the impregnation of the foam material, shearing is stopped; the slurry residing within the foam becomes resistant to flow and is substantially completely retained therein, with little loss due to drainage during the subsequent transfer of the foam from the impregnation area.

Upon completion of the impregnation of the foam with slurry, the impregnated foam material is then treated to remove excess slurry therefrom. This removal or expulsion of excess slurry must be closely controlled and uniformly conducted throughout the body of the foam in order to obtain a uniform ceramic article. As noted earlier, a wide variety of conventional methods are known for the removal of slurry from impregnated organic foam, however, such methods which include squeezing, blowing out by compressed air, centrifuging, and even passage through rolls, do not provide satisfactory results in this respect. Generally, in the case where passage through rolls is employed, the resulting article possesses either the defect of center line blockage, wherein excess slurry remains and agglomerates within the center of the article, or outer surface weakness, wherein insufficient ceramic material remains after expulsion and the article is mechanically weak.

In accordance with the present invention, it has been found that expulsion is advantageously conducted which results in consistently uniform ceramic foam articles by a process comprising conducting at least two passes of the impregnated foam material through preset rollers to effect the compression of said material in the range of about 50 to 90% of its thickness for the first pass and 70 to 90% of thickness for the second pass. Thus, multiple rolling passes conducted at the same or increased percent reductions yield a ceramic article possessing increased strength and freedom from center line blockage. Further, the employment of multiple rolling passes affords the careful control of the permeability of the final ceramic article which is particularly critical when such articles are prepared for use as molten metal filters.

An additional aspect of significance relating to the expulsion technique of the present invention is the use which is made of the thixotropic nature of the slurry in the rolling operation. Thus, because the slurry flows freely under high rates of shear but remains virtually static once shearing ceases, close control over slurry removal is available through control of roll gap (percent reduction), roll speed and/or roll diameter. Specifically, control over the roll gap and roll speed determined the rate of shear experienced by the slurry and, hence, the extent of its removal and the geometry of its redistribution on the web of the rolled foam.

The preferred rolling technique of the present invention utilizes a double pass schedule, although a multiple pass schedule may be desirable in certain instances such as where the foams possess a thickness greater than 2 inches. As noted earlier, the respectivs percent reductions which have been determined with a double pass schedule are 50 to 90% for the first pass and 70 to 90% for the second pass. Preferred percent reductions within the aforenoted ranges are 70 to 80% for the first pass and 70 to 90% for the second pass.

Expulsion may be conducted with a convention roll stand apparatus comprising two cooperating rolls. Thus, the foam material would be passed through the roll stand a first time, and thereafter recirculated for the second pass. In the instance where the second pass is to be conducted at a different percent reduction, a pair of roll stands could be suitably provided in spaced relation to each other to permit the foam material to pass through the respective reductions in a sequential manner. A further variation contemplated within the present invention to provide successive roll gap settings contemplates a single pass through a roll forming mill having three rolls defining the respective sueeessive roll gap settings. This technique offers the advantages of a double pass schedule in a single operation using only a single roll stand.

In addition to the roll stands provided above, the rolls employed therein may be advantageously coated with a material such as grit or the like to increase friction between the foam material and the roll and to thereby prevent or minimize slippage in rolling. A further feature of the apparatus employed in the expulsion of slurry comprises a moving run-out table placed at the exit of the roll stands to support and transfer the newly rolled foam as it emerges therefrom. In sum, the employment of coated rolls and a moving run-out table would serve to add to the integrity, uniformity of structure and shape of the rolled product, since they alleviate unwanted distortion effects and minimize unnecessary handling of the foam article which might disturb slurry distribution.

As noted earlier, the provision of multiple rolling passes has as its advantage the unexpected increase in the permeability of the final foam article. Thus, in the instance where two passs through the rolls are conducted at the same percent reduction, the permeability of the final article has increased by 30 to 50%. This increase is significant when it is considered that the pass schedule leads to a more uniform slurry distribution and ultimately stronger and more uniform articles than would be obtainable by comparable single pass reductions. Further, pass schedules conducted wherein the second or subsequent rolling pass is of a higher percent reduction than the initial pass, have resulted in permeability increases of greater than 100% over the single pass reduction schedule.

After expulsion of excess slurry is complete, the resulting foam structures may be dried and, if desired, fired to provide a fused ceramic foam article. The drying sequence is employed for the primary purpose of removing the organic polymer foam from the article. Generally, conventional drying techniques may be employed in this regard, however, it should be born in mind that a suitable heating rate for the removal of the foam should take into account the heat provided by the oxidation of the foam itself. The effect of this phenomenon is particularly noticeable in the heating of large masses of the foam where a significant volume of the heating chamber may be occupied by the article. In such cases, it may be necessary to maintain the material at a temperature ranging from 400°–700° F to avoid excessive heat up resulting from chemical reaction which may cause the ceramic filaments to rupture under thermal stress. The exact temperature will be dictated by the particular organic foam base used and need not be further developed herein.

As indicated above, the ceramic foam may, if desired, be further heat treated or fired to fuse the ceramic particles into a highly refractory structure. As noted earlier, this practice is optional, as, for example, in the employment of the foam articles of the present invention as filters for molten aluminum, it has been found that the foam material need only be heat treated at a temperature of from 1,000° to 1,1000° F to remove the organic component. The resulting article would be suitable as such for use with aluminum alloy melts at temperature as high as 1,400° F. In such an instance, the air setting or binding agent would provide the necessary strength to the articles, and the full sintering treatment would not be required.

Utilizing the method disclosed above, ceramic foams may be prepared which range in thickness from ¼ to 4 and may be of an area ranging up to about several square feet. The foams would possess, based on the raw foam employed, pore counts of from about 5 to 50 ppi, with permeabilities ranging from about $100 \times 10^{-7}$ cm$^2$ to 10,000 × $10^{-7}$ cm$^2$ and bulk densities of from 0.2 gm/cm$^3$ to 1 gm/cm$^3$.

In the instance where the foam articles of the present invention are utilized as filters for molten metal, air permebilities may range from about 400 to 8,000 × $10^{-7}$ cm$^2$ and pore counts may range from about 5 to 45 ppi. Naturally, as noted earlier, both permeabilities and pore sizes may be vaired to suit the particular mode of end use of the article. Thus, for example, a relatively fine filter may be prepared which would possess an air permeability of from 400 to 2,500 × $10^{-7}$ cm$^2$ and a pore count of from 20 to 45 ppi. Such an article would be useful in the filtration of aluminum alloys of the 5,000 series. However, if, in the instance of molten metal filtration, the input metal is particularly dirty, one should preliminarily filter the metal through a relatively coarse ceramic foam filter having a pore size of between 5 and 20 ppi, and an air permeability ranging from 2,500 to 8,000 ×$10^{-7}$ cm$^2$. This may be accomplished by providing a single filter with a gradation of properties or by using a series of filters of differing porosity.

In accordance with the present invention the advantages and features of the above method will be more readily understandable from a consideration of the following illustrative examples.

EXAMPLE I

A polyester polyurethane foam material was provided having a thickness of 2 inches, containing 30 pores per linear inch and having an air permeabilityof 4,600 × $10^{-7}$ cm$^2$. An aqueous ceramic slurry comprising 47% alumina, 13% chromia, 3.5% kaolin, 1% bentonite, 20% aluminum orthophosphate (50% aqueous solution) was mixed in an 80-quart Hobart mixer at 60 rpm for 1 hour. After one half hour of mixing a sample was removed for viscosity testing. This sample showed that the slurry has a viscosity of 25.5 × $10^3$ cps at 25° C measured with a No. 6 spindle, Brookfield RVT Viscometer at 20 rpm ater 20 minutes testing. A sample of the foam material was immersed in the slurry and repeatedly compressed and expanded with a plunger device for about 30 seconds while the bath of slurry was vibrated at 50 cycles per second in order to fill the voids with slurry. The foam sample thus inpregnated was taken from the slurry and passed through grit coated rolls preset to provide a 70% reduction in thickness to expel the excess slurry. The rolls were of 3 diameter and were driven at a speed of 12.5 rpm. The sample exhibited substantially complete spring-back after rolling was completed.

The sample was then dried in an oven at 150° F for 1 hour and at 200° F for 2 hours. The dried sample was then heated from 200° to 500° F at 100° F/hr., then to 600° F at 20° F/hr, and to 650° F at 100° F/hr. and held at this temperature for 4 hours in order to remove the polyurethane fibers without collapsing the ceramic web. The slow heating rate from 500° to 600° F was needed to prevent a sudden temperature excursion resulting from oxidation of the polyurethane.

The resulting sample was then fired in a kiln using heating rates of 100° F/hr to 1,000° F and 400° F/hr to 2,400° F followed by a furnace cool.

The fired sample proved to be sound and the surface was resistant to spalling. Its permeability was measured as 400 ×$10^{-7}$ cm$^2$ and its bulk denisty 0.74/gm/cm$^3$. The body possessed good physical strength and its modulus of rupture was found to be 25 psi. However, sectioning the body revealed that it possessed a non-uniform structure, as it suffered from a center line blockage which would preclude its use in many applications such as filtration of molten metal.

EXAMPLE II

Another sample was prepared in accordance with the practice employed in Example I, with the exception that a variation in the percent reduction in rolling was made. In the present example, the roll gap was set to give an 86% reduction, comprising a significant increase over that of Example I.

The fired sample appeared to be sound but possessed rather weak surfaces and edges which made it susceptibe to spalling in rough handling. Its permeability was measured as 1,600 × $10^{-7}$ cm$^2$ and its bulk density as 0.39 gm/cm$^3$. The body possessed adequate physical strength and its modulus of rupture was found to be 18 psi. Sectioning the body revealed that it was quite uniform although the outer fibers were somewhat finer than those of the bulk which explained its characteristic weak surfaces. This reasonably uniform body would be suitable for applications where surface strength is of lesser importance compared to overall uniformity, and does not comprise a drawback. The fragility of the body, however, would render it unsuitable for use as a filter, particularly of molten aluminum.

EXAMPLE III

A further sample prepared in accordance with the practice described in Example I was subjected to a two pass rolling schedule employing, respectively, roll reductions of 75% (first pass) and 86% (second pass). The above double pass schedule was within the purview of this invention.

The fired sample proved to be sound and possessed strong surfaces and edges. Its permeability was measured as 1,700 ×$10^{-7}$ cm$^2$ and its bulk denisty as 0.41 gm/cm$^3$. The body possessed excellent strength and its modulus of rupture was found to be 27 psi. Sectioning the body revealed that it was exceptionally uniform having a moderate number of blocked pores evenly distributed through its bulk. This uniform, strong sample would be suitable for critical applications such as filtration of molten metal.

EXAMPLE IV

An additional sample was prepared with a polyester polyurethane foam possessing a thickness of 2 inches, containing 30 pores per linear inch and having an air permeability of 6,000 ×$10^{-7}$ cm$^2$. The ceramic slurry employed was of the same composition as in Example I, but possessed a viscosity of 31 ×$10^3$ cps.

The foam sample was impregnated in the manner disclosed in Example I. Expulsion of slurry was carried out with a double pass rolling schedule, wherein the first pass was set at a reduction of 62%, and the second pass at a reduction of 86%.

The resulting sample was dried and fired, and, on inspection, was observed to have an air permeability of 1,700 ×$10^{-7}$ cm$^2$. The sample possessed a uniform structure which was free from surface fragility and center line blockage, and was therefore suitable for use as a molten metal filter.

EXAMPLE V

An additional sample was processed in accordance with the procedure of Example I to further illustrate the present invention. A polyester polyurethane foam was employed which differed from the previous samples in possessing an air permeability of 4,700 ×10⁻⁷ cm². Likewise, the ceramic slurry was the same with the exception that its viscosity was 25 ×10³ cps.

As noted, processing was identical to Example I, with the difference that expulsion was conducted with a double-pass rolling schedule wherein the first pass was performed to an 84% reduction, while the second pass was set at 86%.

Upon drying and firing, the resulting sample was likewise sound and uniform, and free from both surface weakness and center line blockage. The sample possessed a permeability of 2,650 ×10⁻⁷ cm² and is considered suitable for use as a filter of molten metal.

Unless otherwise specified, all percentages expressed herein are in terms of percent by weight.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method of preparing a ceramic foam possessing controlled permeability and structural uniformity which comprises:
    A. providing a hydrophobic, reticulated organic polymer foam possessing a predetermined permeability and resilience;
    B. preparing an aqueous slurry of a thixotropic ceramic composition having a viscosity within the range $1 \times 10^3 - 80 \times 10^3$ cps;
    C. impregnating said polymer foam material with said slurry while shearing said slurry an amount sufficient to maximize impregnation and completely saturate said foam material;
    D. expelling excess slurry from said foam material by conducting multiple rolling passes of said material through preset rollers, wherein said first pass effects a temporary compression ranging from about 50-90%, said multiple passes being conducted at the same or increased percent reduction; and
    E. drying and heating said foam material to remove the organic component therefrom.

2. A method of preparing a ceramic foam possessing controlled permeability and structural uniformity which comprises:
    A. providing a hydrophobic, reticulated organic polymer foam possessing a predetermined permeability and resilience;
    B. preparing an aqueous slurry of a thixotropic ceramic composition having a viscosity within the range $1 \times 10^3 - 80 \times 10^3$ cps;
    C. impregnating said polymer foam material with said slurry while shearing said slurry an amount sufficient to maximize impregnation and completely saturate said foam material;
    D. expelling excess slurry from said foam material by conducting at least two passes of said material through preset rollers to effect a temporary compression ranging from about 50-90% for the first pass an 70-90% for the second pass; and
    E. drying and heating said foam material to remove the organic component therefrom.

3. The method of claim 2 wherein said organic polymer foam possesses a resilience measured by the ball rebound test, of greater than 25%, a compression set of less than 30% at 50% compression, and a pore size ranging from 5-50 ppi.

4. The method of claim 3 wherein said polymer material is selected from the group consisting of polyester polyurethanes polyether polyurethanes, polyvinyl foam materials, and cellulosic derivative.

5. The method of claim 2 wherein said aqueous slurry contains a ceramic composition comprising materials selected from the group consisting of alumina, chromia, zirconia, magnesia, titania, silica, mullite, calcined clay, and mixtures thereof.

6. The method of claim 5 wherein said composition further comprises from 5-80% of an air setting agent and 1-12% of a rheological agent.

7. The method of claim 6 wherein said air setting agent is selected from the group consisting of colloidal aluminum orthophophate, alkali metal silicates, ethyl silicate, aluminum hydroxychloride, magnesium orthoborate and mixtures thereof, in a 50% aqueous solution.

8. The method of claim 6 wherein said rheological agent is selected from the group consisting of organic cellulosic derivatives, bentonite, kaolin and mixtures thereof.

9. The method of claim 5 wherein said slurry comprises from about 40-80% alumina, up to 20% chromia, colloidal aluminum orthophosphate (50% solution) in an amount of from 5-50%, kaolin in an amount up to about 10% and bentonite in an amount up to about 0.1-10%.

10. The method of claim 9 wherein said slurry commprises 45-50% alumina, 10-15% chromia, 25-35% of said aluminum orthophosphate, 2-5% kaolin, and 0.5-2% bentonite.

11. The method of claim 2 wherein impregnation is conducted by the immersion compression of said foam within said slurry, followed by the release of said compression.

12. The method of claim 11 wherein said compression is provided by a pair of rolls situted within a bath of said slurry.

13. The method of claim 11 wherein said compression is conducted by repeated compression and expansion of said foam for a period of time ranging from 30 seconds-1 minute.

14. The method of claim 2 wherein impregnation is conducted by the placement of a vacuum force on said foam while said foam is in contact on an opposite side thereof with said slurry.

15. The method of claim 2 wherein said slurry is sheared by mechanical agitation.

16. The method of claim 15 wherein said agitation comprises continual high speed stirring.

17. The method of claim 15 wherein said agitation comprises continual high speed vibration of said slurry.

18. The method of claim 2 wherein said first pass achieves a reduction of from 70-80%, and said second pass achieve a reduction of 70-90%.

19. The method of claim 2 wherein said passes are conducted by passing said foam material through a single roll stand a plurality of times.

20. The method of claim 2 wherein said passes are conducted by passing said foam through a plurality of successive roll stands.

21. The method of claim 2 wherein said drying step is conducted at a temperature ranging up to 1,100° F.

22. The method of claim 21 wherein said drying is conducted at a temperature ranging from about 400-700° F.

23. The method of claim 22 wherein said foam material is further heated to sinter said ceramic composition entrained therein.

24. The method of claim 2 wherein the viscosity of said slurry ranges from about $10 \times 10^3$ to $40 \times 10^3$ cps.

* * * * *

UNITED STATES PATENT OFFICE
CERTIFICATE OF CORRECTION

PATENT NO. : 4,024,212

DATED : May 17, 1977

INVENTOR(S) : James E. Dore, John C. Yarwood and Robert K. Preuss

It is certified that error appears in the above-identified patent and that said Letters Patent are hereby corrected as shown below:

In the ABSTRACT, line 4, the word "a", second occurrence, should read ---an---.

Column 1, line 31, the word "articles" should read ---article---.

Column 2, line 26, the word "tolerences" should read ---tolerances---;

Column 2, line 61, the word "incorpoated" should read ---incorporated---.

Column 3, line 30, the word "exaple" should read ---example---.

Column 4, line 3, "1/2 to 4" should read ---1/2" to 4"---;

Column 4, line 38, the word "succssfully" should read ---successfully---.

Column 5, line 4, the word "of" should read ---or---;

Column 5, line 27, the word "provided" should read ---provides---;

Column 5, line 64, "$1 \times 10^3$ to $80 \times 3$" should read ---$1 \times 10^3$ to $80 \times 10^3$---.

Column 6, line 20, the word "expell" should read ---expel---;

Column 6, line 30, after the word "slurry" the comma "," should be deleted and a period ---.--- should be inserted;

Column 6, line 44, the word "its" should read ---it---.

Column 7, lines 37 & 38, the word "determined" should read ---determine---

Column 7, line 45, the word "respectivs" should read ---respective---;

UNITED STATES PATENT OFFICE
CERTIFICATE OF CORRECTION

PATENT NO. : 4,024,212
DATED : May 17, 1977
INVENTOR(S) : James E. Dore, John C. Yarwood and Robert K. Preuss It is certified that error appears in the above-identified patent and that said Letters Patent are hereby corrected as shown below:

Column 7, line 51, the word "convention" should read ---conventional---.

Column 8, line 17, the word "passs" should read ---passes---;

Column 8, line 35, the word "born" should read ---borne---;

Column 8, line 59, the word "temperature" should read ---temperatures---;

Column 8, line 61, the word "articles" should read ---article---;

Column 8, line 64, "1/4to 4" should read ---1/4" to 4"---.

Column 9, line 5, the word "permebilities" should read ---permeabilities---

Column 9, line 23, after the word "invention" a comma ---,--- should be inserted;

Column 9, line 38, the word "has" should read ---had---;

Column 9, line 40, the word "ater" should read ---after---;

Column 9, line 45, the word "inpregnated" should read ---impregnated---;

Column 9, line 48, after "3" insert inches ---"---;

Column 9, line 66, the word "denisty" should read ---density---.

Column 10, lines 14 & 15, the word "susceptibe" should read ---susceptible---;

Column 10, line 38, the word "denisty" should read ---density---.

UNITED STATES PATENT OFFICE
CERTIFICATE OF CORRECTION

Patent No. 4,024,212    Dated May 17, 1977

Inventor(s) James E. Dore et al.

It is certified that error appears in the above-identified patent and that said Letters Patent are hereby corrected as shown below:

Column 11, line 14, "$cm^2$," should read ---$cm^2$,---;

Column 11, line 35, "$1 \times 10^3 - 80 \times 10^3$" should read ---$1 \times 10^3 - 80 \times 10^3$---;

Column 11, line 57, "$1 \times 10^3 - 80 \times 10^3$" should read ---$1 \times 10^3 - 80 \times 10^3$---;

Column 11, line 66, the word "an" should read ---and---.

Column 12, line 8, after the word "polyurethanes", first occurrence, insert a comma ---,---;

Column 12, line 9, after the word "derivative" the word ---foams--- should be inserted;

Column 12, line 16, "5-80%" should read ---5-50%---;

Column 12, line 17, "1-12%" should read ---0.1-12%---;

Column 12, line 20, the word "orthophophate" should read ---orthophosphate---;

UNITED STATES PATENT OFFICE
CERTIFICATE OF CORRECTION

Patent No. 4,024,212      Dated May 17, 1977

Inventor(s) James E. Dore et al.

It is certified that error appears in the above-identified patent and that said Letters Patent are hereby corrected as shown below:

Column 12, lines 36 & 37, the word "commprises" should read ---comprises---;

Column 12, line 44, the word "situted" should read ---situated---;

Column 12, line 62, the word "achieve" should read ---achieves---.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*